United States Patent

Anthony

[15] 3,635,318
[45] Jan. 18, 1972

[54] CONTROL DEVICE FOR ROTATING APPARATUS

[72] Inventor: Tad B. Anthony, Newton, Iowa
[73] Assignee: The Maytag Company, Newton, Iowa
[22] Filed: Dec. 18, 1969
[21] Appl. No.: 886,155

[52] U.S. Cl. .................................. 192/8 R, 192/1, 192/2, 192/11, 68/23 R
[51] Int. Cl. ................................................ F16d 67/00
[58] Field of Search .................. 192/1, 2, 11, 8 R; 210/368; 68/23 R

[56] References Cited

UNITED STATES PATENTS 3,367,459   2/1968   Rubin .................................. 192/11

Primary Examiner—Mark M. Newman
Assistant Examiner—Randall Heald
Attorney—William G. Landwier and Richard L. Ward

[57] ABSTRACT

A brake device includes a pivotally mounted arm engageable with a drive belt. The pivotally mounted arm is self actuating for applying a braking drag to the belt responsive to the change in the belt from a loose side condition to a tight side condition.

21 Claims, 6 Drawing Figures

PATENTED JAN 18 1972

INVENTOR
TAD B. ANTHONY
BY
William G. Landwier
AGENT

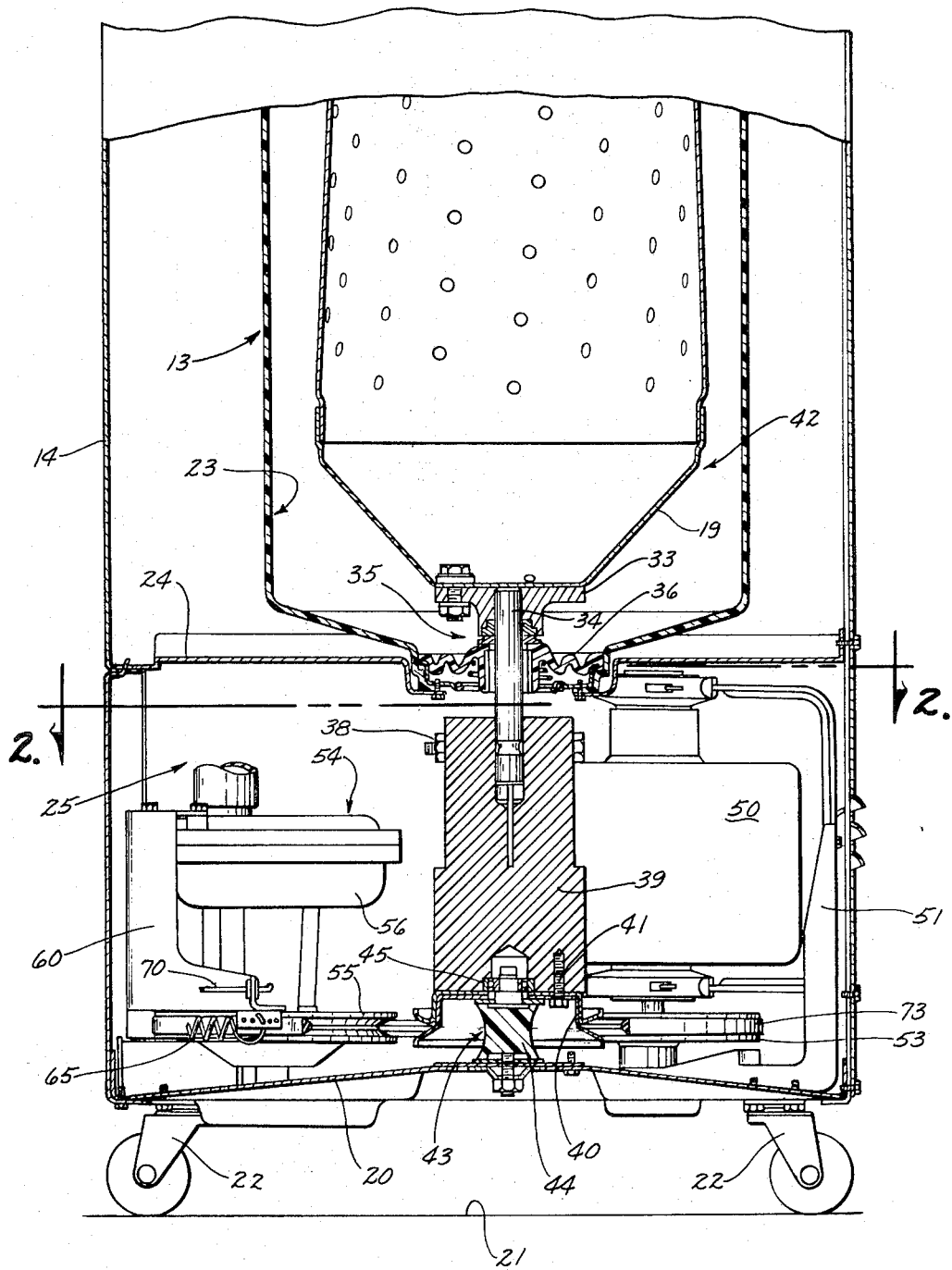

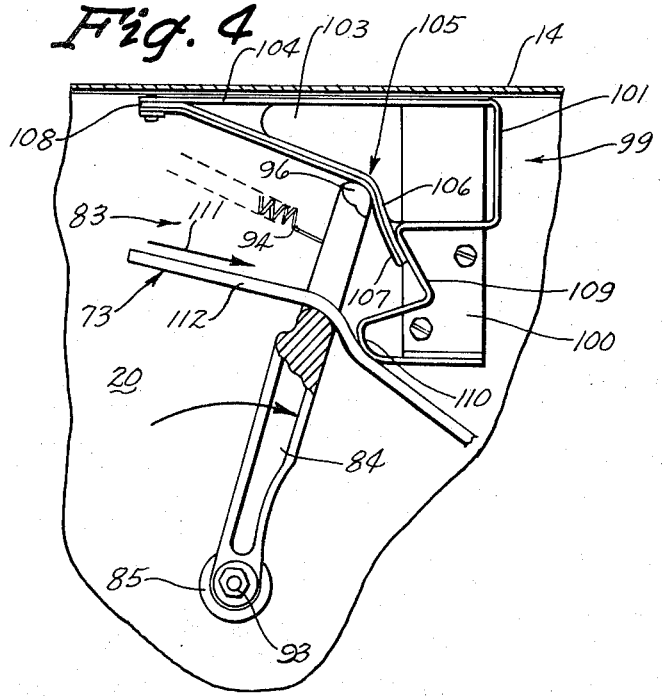
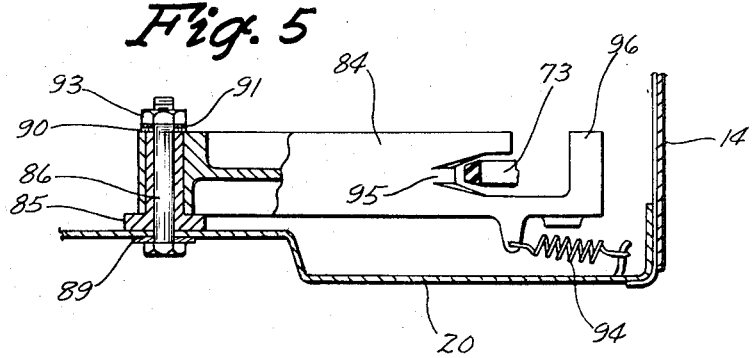
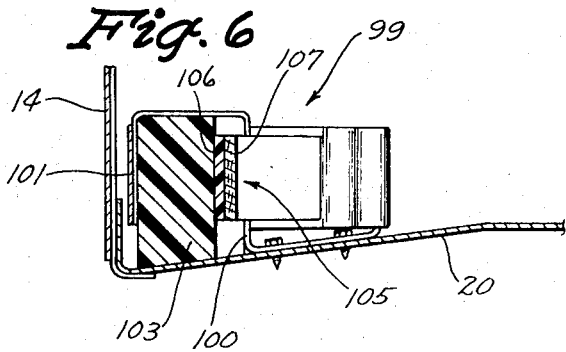

CONTROL DEVICE FOR ROTATING APPARATUS

BACKGROUND OF THE INVENTION

1. Field of the Invention

This invention relates to control mechanisms for a rotating apparatus and more particularly to a control device having a belt-engaging arm responsive to a change in belt tension.

2. Description of the Prior Art

Prior art includes use of friction devices engageable with a belt to apply a drag on the belt to effect a braking of the rotating member. These prior art brakes, however, are selectively controlled and responsive only to a manual actuation or to a predetermined programmed actuation for effecting a braking of the belt.

SUMMARY OF THE INVENTION

It is an object of the instant invention to provide an improved control device for a rotating apparatus.

It is a further object of the instant invention to provide an improved belt brake mechanism useful in a belt-driven rotating apparatus.

It is still a further object of the instant invention to provide a self-actuatable belt brake responsive to a change of a portion of the belt from a loose side condition to a tight side condition for applying a braking drag to the belt and decreasing the speed of rotation of the rotatable member.

These objects are achieved in a centrifugal extractor apparatus as included in a washing machine wherein the extractor apparatus is driven by a motor through an endless belt. In one embodiment, a movable member is engageable with the portion of the belt that has a loose side condition while the motor is driving the rotatable member. There is little or no engagement between the movable member and the belt during normal motor driven operation of the apparatus and friction drag is below the predetermined drag that is effective for initiating movement of the movable belt-engaging member from a first to a second position. The movable member is responsive to the change from a loose side condition to a tight side condition and moves to a second position for effecting or initiating a control function. In a preferred embodiment, this control function is one of effecting a braking or reduction in speed of rotation of the rotatable member.

Operation of the device and further objects and advantages thereof will become evident as the description proceeds and from an examination of the accompanying three pages of drawings.

DESCRIPTION OF THE DRAWINGS

The drawings illustrate a preferred embodiment of the invention with similar numerals referring to similar parts throughout the several views, wherein:

FIG. 3 is a vertical section view of the centrifugal extractor portion of the washing apparatus of FIG. 1;

FIG. 4 is a fragmentary view showing further details of operation of the instant invention;

FIG. 5 is a fragmentary view of the belt engageable member included in the system of the instant invention; and FIG. 6 is a fragmentary view, partially in section, showing further components of the instant invention as taken along line 6—6 of FIG. 2.

DESCRIPTION OF THE PREFERRED EMBODIMENT

Figure 1:
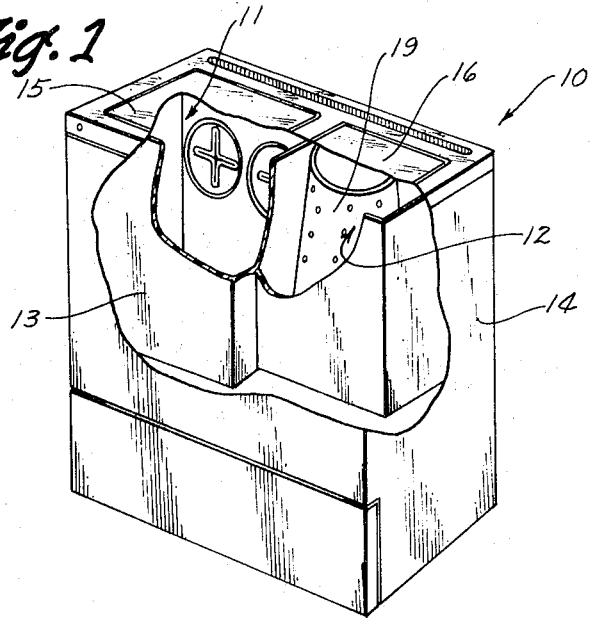
FIG. 1, located in a lower portion of the first page of drawings, shows a simplified perspective view of a laundry machine including a centrifugal extractor apparatus.

Referring to FIG. 1, there is shown a laundry machine 10 including washing and centrifugal extraction portions 11 and 12 enclosed within a tub 13 and in turn in a cabinet structure 14 wherein the washing and centrifugal extraction portions 11 and 12 are individually accessible through a pair of lids 15 and 16. The instant invention is primarily directed to the centrifugal extraction portion 12 of the laundry machine 10 and to the control of rotation of the perforated fabric container 19.

Referring to the plan view of FIG. 2 and to the vertical section of FIG. 3, the mounting of the centrifugal extractor and the drive system for the rotatable fabric container 19 will be described. The cabinet structure 14 is mounted on a base member 20 that is in turn supported on a horizontal surface 21 by a plurality of casters 22. The tub 13 within the cabinet structure 14 defines a first compartment or fluid container 23 in which is disposed the rotatable fabric container or spinner 19. A substantially horizontal divider or bulkhead 24 is positioned below the tub 13 and defines a lower chamber 25 for the drive system of the washing apparatus.

The fabric container 19 is fixed to a hub 33 and in turn to a shaft 34 and is rotatable within the fluid container 23. A seal assembly 35 is positioned at the bottom of the fluid container 23 substantially coaxial with the shaft 34 and is operable for closing the bottom of the container 23 and providing a dynamic seal connection with the hub 33. The seal assembly 35 includes a convoluted portion 36 and permits nutational movement of the fabric container 19 relative to the fluid container 23 during rotative operation of the centrifugally driven fabric container.

The mounting of the centrifugally rotatable fabric container 19 further includes a weighted coupling member 39 fixed to shaft 34 by clamping bolts 38 and providing a coupling of the shaft 34 to a driven pulley 40. The driven pulley 40 is attached to the weighted coupling member 39 by a plurality of threaded members 41. The spinner assembly 42 including the container 19, hub 33, shaft 34, coupling 39, and driven pulley 40 is in turn rotatably supported on a resilient mounting assembly 43 fixed to the base member 20. The resilient mounting assembly 43 includes a resilient flexible portion 44 permitting nutational movement of the spinner assembly 42 relative to the base 20. A bearing 45 is provided between the resilient mount and the spinner assembly.

Further details of construction and mounting of the centrifugal extractor is shown in the copending application entitled "Centrifugal Extractor Mounting" filed by Edward O. McCartney on the date of filing of the instant invention.

Figure 2:
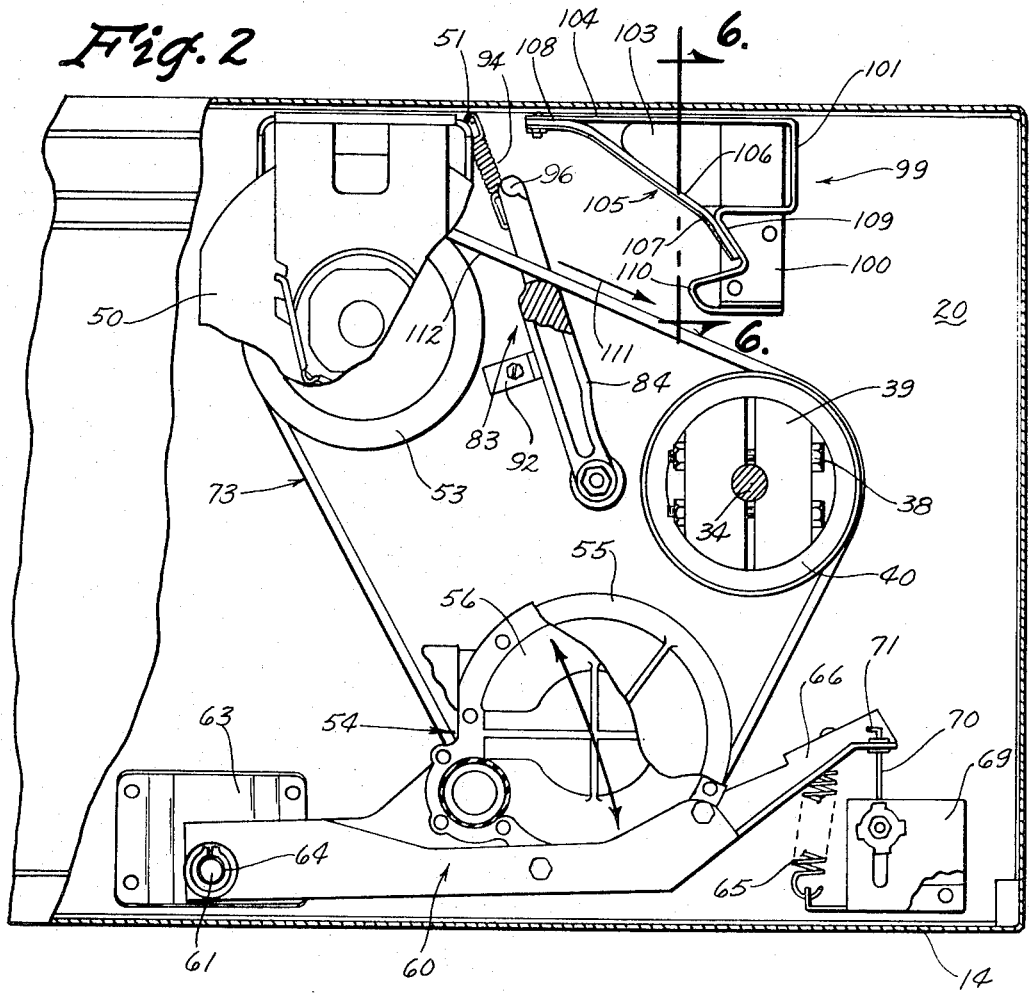
FIG. 2 is a plan view partially in section showing the subject matter of the instant invention and taken generally along lines 2—2 of FIG. 3.

The drive system for the centrifugal extractor is best shown in FIG. 2 and includes an electrically energizable motor 50 rigidly mounted on the base 20 through mounting bracketry 51 and having a drive pulley 53 disposed at the lower end of the motor 50 and in substantially the same horizontal plane as the driven pulley 40 that forms a part of the spinner assembly 42.

The laundry machine further comprises fluid pumping means 54 operable for controlling fluid flow in the fluid system of the laundry machine and including a pulley 55 substantially aligned in the horizontal plane of the driving pulley 53 and the driven pulley 40. The pump pulley 55 is driven by the motor 50 for operating the pump 56 but in addition the pumping means 54 is pivotally mounted on the base frame 20 so that the pump pulley 55 is operable as an idler in the drive system of the extractor.

The pumping means 54 is secured to an elongated pump-supporting bracket 60 that is in turn pivotally supported on a pivot pin 61 at one end. The pivot pin 61 is secured to a mounting bracket 63 that is securely mounted to the base 20. The pump-supporting bracket 60 is in turn retained on the pivot pin 61 by a retaining ring 64. The pump-supporting bracket 60 is biased in a clockwise direction about the pivot pin 61 by a spring 65 connected between the outwardly extending arm 66 of the pump-supporting bracket 60 and a fixed bracket 69 mounted on the base frame 20. A stop member 70 is adjustably connected to the fixed bracket 69 and includes a finger 71 engageable with the arm 66 of the pump-supporting bracket 60 for limiting movement of the pumping means 54 in the counterclockwise direction during operation of the extractor as will be more fully shown hereinafter. A V-belt 73 drivingly connects the driving pulley 53 to the driven pulley 40 and the pump pulley 55.

Referring to FIGS. 2 and 4 through 6, there is shown a control system indicated generally by numeral 83, associated with the drive belt 73 and responsive to specific conditions of the drive belt 73 for initiating or effecting a control function of the extractor apparatus. In the instant embodiment, the control system 83 is operable for applying a frictional drag to the belt 73 for effectively reducing the speed of rotation of the spinner assembly 42.

In the preferred embodiment shown, a movable member is included in the control system 83 of the instant invention in the form of a brake arm member 84 pivotally mounted on the base 20. As best shown in FIG. 5, the pivotal mounting includes a flanged sleeve bearing 85, a bolt 86 extending through the sleeve bearing, a pair of washers 89 and 90, a lock washer 91, and a nut 93. Referring now to FIG. 2, the brake arm member 84 is biased about the pivot mounting against an adjustable stop 92 by a spring member 94 connected between the brake arm member 84 and the base 20. Spring 94 and the adjustable stop 92 position the arm 84 so that there is little or no contact between the belt 73 and the brake arm member 84 while the motor is at rest and during normal motor driven operation of the spinner assembly.

Referring again to FIG. 5, the brake arm member 84 includes a V-slot 95 corresponding substantially to the shape of the V-belt 73 for frictional engagement with the sides of the V-belt 73. As previously indicated, the biasing and stop 92 maintain the V-slot 95 of the brake arm 84 positioned for little or no frictional drag on the V-belt 73 during normal motor driven operation of the centrifugal extractor.

The pivotally mounted brake arm member 84 also includes an outwardly disposed finger portion 96 engageable with a stop assembly 99 disposed adjacent the operative braking position of the brake arm 84. The stop assembly 99, as best shown in FIGS. 4 and 6, includes a first bracket 100 fixed to the base 20 and a second bracket 101 in turn fixed to the first bracket 100. The pair of brackets 100, 101 are operable for confining a resilient cushion 103 of polyurethane foam while the second bracket 101 also provides a supporting flange 104 for a flexible and resilient pad 105 engageable by the finger portion 96 of the brake arm member. The flexible pad 105 is laminated and includes a solid but flexible polyurethane layer 106 and a polypropylene felt layer 107. The laminated pad 105 is fixed at one end 108 to the supporting flange 104 and is free to move relative to the surface 109 of the second bracket 101 at the other end upon engagement by the brake arm member 84. The finger portion 96 is engageable with the polypropylene felt layer 107 to achieve the proper frictional characteristics under varying operating conditions.

The second bracket 101 also defines a projecting portion 110 engageable by the backside of the V-belt 73, as in FIG. 4, upon movement of the brake arm 84 to its braking position. Engagement of the belt 73 with the projecting portion 110 tends to effect a reverse bend in the belt and to force the belt 73 further into the V-groove 95 for increasing the braking drag on the belt 73. This arrangement permits a more compact system than one in which a long brake arm and a wide arc of movement are utilized to effect increased braking.

By way of further explanation of the instant invention, the operation of the centrifugal extractor and the operation of the braking system for decreasing the speed of rotation of the spinner assembly 42 will now be explained. Upon energization, the motor 50 is operable for accelerating and driving the spinner assembly 42 through the V-belt 73 engageable with the driven pulley 40 and with the movably mounted pump pulley 55. With the motor 50 operating in a clockwise direction and the belt 73 moving as indicated by the arrow 111 in FIGS. 2 and 4, the first leg 112 of the belt 73 extending between the motor pulley 53 and the driven pulley 40 assumes a slack or loose side condition.

It has been previously indicated that the brake arm member 84 is positioned for little or no engagement with the belt 73.

Furthermore, during acceleration of the spinner assembly 42 by the motor 50, the pump pulley 55 is pulled inwardly so that the belt 73 becomes more slack and tends to move away from the brake arm 84 and therefore the frictional drag between the belt 73 and the V-slot 95 is at a minimum and does not hinder acceleration of the spinner assembly 42.

The spinner assembly 42 in the instant embodiment is accelerated toward and reaches an approximate operating speed of 2,000 r.p.m. During this normal motor driven operation, the movable brake arm member 84 is at most only lightly engaged with the belt 73 in its loose side condition and there is little or no frictional drag between the belt 73 and the brake arm 84.

Upon deenergization of the motor 50, the motor rotor and motor pulley 53 immediately start to decelerate, whereas the spinner assembly 42 with a relatively large rotating mass decreases in speed more slowly and overdrives the motor 50 and effectively becomes the driver. The spinner assembly 42 could also be responsive to accelerating forces from power sources other than the motor 50 for overdriving the motor 50. With the spinner assembly 42 effectively driving the motor 50, the belt leg 112 between the motor pulley 53 and the extractor pulley 40 assumes a tight side condition. The change to a tight side condition causes the belt 73 to immediately pick up the brake arm 84 through a rather substantial increase in drag between the belt 73 and the V-groove 95 of the brake arm 84 and causes the brake arm 84 to move from the position shown in FIG. 2 toward the position shown in FIG. 4. Once movement of the brake arm 84 is initiated, the drag between the belt 73 and the brake arm 84 builds up rapidly and the movable brake member 84 is moved quickly from the first normal position to the second braking position. The brake thus operates automatically in response to the deenergization of the motor 50 and the attempted overrunning of the motor 50 by the spinner assembly 42.

In the position of FIG. 4, the belt 73 tends to be forced down into the V-groove of the brake arm by engagement with the projecting portion 110 of the stop assembly 99 and a still further substantial increase in the amount of frictional drag is supplied to the belt 73 for braking or reducing the speed of rotation of the spinner assembly.

It will be seen that the stop 70 on the pivotal operation of the movable pump pulley 55 comes into play during the braking operation because, in the absence of idler stop means or other belt tension control means, the pump assembly 54 would continue to move inwardly and provide slack on the belt leg 112 between the driving pulley 53 and the driven pulley 40. In the present embodiment, however, wherein the idler stop 70 is provided, the pump assembly 54 is movable only as far as the finger 71 permits so that movement of the brake arm 84 from the first position to the second position increases the amount of tension on the belt leg 112 between the motor pulley 53 and the container pulley 40 so that the increased drag is applied to the belt 73.

As an alternate to, or an addition to, the braking function, the movement of the movable arm member 84 could also be used for initiating other control functions through mechanical or electrical systems connected to or actuated by the brake arm 84 by its movement between the first and the second positions. Such functions would be those that are responsive to, or related to, the energization and deenergization of the motor 50 or rotation of the fabric container 19.

Referring again to the stop assembly 99 in FIGS. 2, 4, and 6, it is seen that, upon movement of the brake arm 84 from the first position as shown in FIG. 2 to its second position shown in FIG. 4, the outwardly disposed brake arm finger 96 engages with the flexible pad 105 and compresses the resilient cushion 103. It is thus seen that the resilient pad 105 and cushion 103 function as a stop but in addition provide an additional biasing force for assisting the biasing spring 94 in initiating the return of the brake arm 84 from the position shown in FIG. 4 to the position shown in FIG. 2 upon the completion of the braking operation. At the completion of the braking operation, the belt 73 is stopped and the leg 112 of the belt 73 is relaxed so that the combined biasing force of the spring 94, the resilient pad 105, and cushion 103 is sufficient to return the movable brake arm 84 to the first position.

By way of comparison, the spinner assembly 42 forming a part of the laundry machine 10 shown in this application is operable for coasting from its full speed of 2,000 r.p.m. to a stop condition in approximately 20 to 25 seconds. The braking device shown as a preferred embodiment of this invention is operable for reducing the speed of rotation of the spinner assembly to a stop in approximately 3 seconds. This braking operation dissipates approximately ¾ horsepower in reducing the speed of the spinner assembly from 2,000 r.p.m. to 0 r.p.m.

It is therefore seen that the instant invention provides unique advantages over the braking systems shown in the prior art. The instant invention provides a self-actuating braking device responsive to the deenergization of the motor 50 for effecting a very rapid efficient braking of a rotatable member. The brake is fast acting yet includes a limited number of moving parts and is quiet in operation and low in manufacturing cost. These factors are all extremely important in providing a braking system for a home laundry appliance.

In the drawings and specification, there has been set forth a preferred embodiment of the invention and, although specific terms are employed, these are used in a generic and descriptive sense only and not for purposes of limitation. Changes in form and the proportion of parts as well as the substitution of equivalents are contemplated as circumstances may suggest or render expedient without departing from the spirit or scope of this invention.

I claim:

1. In a belt driven apparatus, the combination comprising: a rotatable member; drive means for rotating said rotatable member; endless belt means drivingly connecting said drive means to said rotatable member, said endless belt means including a first leg having a first tension condition when said drive means is rotating said rotatable member in a first direction and a second tension condition when said rotatable member overdrives said driving means in said first direction, the change from said first tension condition to said second tension condition including displacement of said first leg from a first position to a second position; and belt-engageable means juxtaposed said first leg operably disengaged from said first leg in said first position and operably engageable with said first leg in said second position, said belt-engageable means being responsive to the displacement of said belt means to said second position for initiating an auxiliary control function in the operation of said belt driven apparatus.

2. In a belt driven apparatus, the combination comprising: a rotatable member; drive means for rotating said rotatable member; endless belt means drivingly connecting said drive means to said rotatable member, said endless belt means including a first leg having a first tension condition when said drive means is rotating said rotatable member in a first direction and a second tension condition when said rotatable member overdrives said driving means in said first direction; and belt-engageable means juxtaposed said first leg and operably disengaged from said first leg in said first tension condition, said endless belt means being responsive to the change from said first tension condition to said second tension condition by moving from a first position to a second position to effect operable engagement with said belt-engageable means, said belt-engageable means being responsive to the movement of said belt means into operable engagement for initiating an auxiliary control function in the operation of said belt driven apparatus.

3. In a belt driven apparatus, the combination comprising: a rotatable member; drive means for rotating said rotatable member; endless belt means drivingly connecting said drive means to said rotatable member, said endless belt means including a first leg having a loose side condition when said drive means is rotating said rotatable member in a first direction and a tight side condition when said rotatable member overdrives said driving means in said first direction; and belt-engageable means juxtaposed said first leg and operably disengaged from said first leg in said loose side condition and operably engageable with said first leg in said tight side condition, said belt-engageable means including a member movable by said belt means and operable in the tight side condition for applying frictional drag to said belt means.

4. In a belt driven apparatus as defined in claim 3 wherein said belt-engageable means is movably mounted and operable from a first position to a second position and wherein said belt-engageable means is operable for applying relatively no frictional drag to said belt means in said first position and operable for applying substantial frictional drag to said belt means in said second position.

5. In a belt driven apparatus, the combination comprising: a rotatable member; drive means for rotating said rotatable member; endless belt means drivingly connecting said drive means to said rotatable member, said endless belt means including a first leg having a first tension condition when said drive means is rotating said rotatable member in a first direction and a second tension condition when said rotatable member overdrives said driving means in said first direction; and movably mounted means engageable with said first leg and movable by said belt means from a first operably disengaged position with said first leg in said first tension condition to a second operably engaged position with said first leg in said second tension condition, said movably mounted means being operable in said second position for effecting an auxiliary control function in the operation of said belt driven apparatus.

6. In a belt driven apparatus as defined in claim 5 wherein said first leg has a loose side condition when said drive means is rotating said rotatable member in said first direction and a tight side condition when said rotatable member overdrives said drive means in said first direction and wherein said movably mounted means is responsive to frictional drag accompanying the change from said loose side condition to said tight side condition for moving to said second position.

7. In a belt driven apparatus as defined in claim 5 wherein said movably mounted means includes a pivoted brake arm having substantially no frictional engagement with said first leg in said first position and responsive to the additional frictional drag accompanying a change from said first tension condition to said second tension condition for moving to a second position and applying a substantially increased frictional drag to said endless belt means to effect a braking of said rotatable member.

8. In a belt driven apparatus, the combination comprising: rotatable means including a driven pulley; motor means including a driving pulley and operable for rotating said rotatable means; endless belt means drivingly connecting said driving and driven pulleys; a first leg of said endless belt means having a loose side condition when said motor means is driving said rotatable means in a first condition and a tight side condition when said rotatable means overdrives said motor means; and a movably mounted member juxtaposed to said first leg and having a first position effectively disengaged from the first leg in said loose side condition, said movably mounted member being responsive in said first position to the change of first leg from the loose side condition to the tight side condition for moving to a second position and applying frictional drag to said belt means to reduce the speed of rotation of said rotatable means.

9. In a belt driven apparatus as defined in claim 8 wherein said movably mounted member is in the form of a pivotally mounted brake arm and wherein said combination further includes means for biasing said pivotally mounted brake arm to said first position.

10. In a belt driven apparatus as defined in claim 9 wherein said combination further includes a resilient stop means engageable by said brake arm at said second position.

11. In a belt driven apparatus as defined in claim 9 and further including second biasing means operable on said brake arm in said second position to initiate return of said brake arm from said second position towards said first position responsive to completion of the braking operation.

12. In a belt driven apparatus as defined in claim 9 and further including second brake means engageable with said belt means and cooperable with said brake arm in said second position for effecting the application of a substantially increased amount of drag to said belt means to effect a braking of said rotatable means.

13. In a belt driven apparatus, the combination comprising: rotatable means including a driven pulley; motor means including a driving pulley and operable for rotating said rotatable means; endless belt means drivingly connecting said driving and driven pulleys; movably mounted idler means including an idler pulley engageable with said belt means and further including means for biasing said idler pulley to maintain driving tension on said belt means, said endless belt means including a first leg between said driving pulley and said driven pulley having a loose side condition and a second leg between said driving pulley and said idler pulley having a tight side condition when said motor means is driving said rotatable means in a first direction, said first leg being changeable from the loose side condition to the tight side condition when said rotatable means overdrives said motor means; a pivotally mounted brake member juxtaposed to said first leg and biased to a first position effectively disengaged from said first leg in the loose side condition and responsive in said first position to the change of said first leg from the loose side condition to the tight side condition for moving to a second position and applying very substantially increased frictional drag to said belt means for reducing the speed of rotation of said rotatable means.

14. In a belt driven apparatus as defined in claim 13 and further including stop means for limiting movement of said idler means and limiting the amount of slack available in said belt means and wherein said idler means is operable to said stop means responsive to movement of said brake member toward said second position and wherein further said movably mounted brake member is operable in said second position for substantially increasing the tension on said belt means and substantially increasing the drag on said belt means to reduce the speed of rotation of said rotatable means.

15. In a belt driven apparatus as defined in claim 13 and further including second brake means engageable with said belt means and cooperable with said pivotally mounted brake member in said second position for effecting the application of a substantially increased amount of drag to said belt means to effect a braking of said rotatable means.

16. In a belt driven apparatus as defined in claim 13 and further including resilient stop means engageable by said brake member at said second position to limit movement thereof and to apply a return bias on said brake member from said second position towards said first position responsive to completion of the braking operation.

17. In a belt driven apparatus, the combination comprising: a rotatable member including a driven pulley; motor means including a driving pulley; endless belt means drivingly connecting said driving and driven pulleys for effecting rotation of said rotatable member by said motor means, said endless belt means including a first leg having a loose side condition when said motor means is rotating said rotatable member in a first direction and a tight side condition when said rotatable member overdrives said motor means in said first direction; brake means including a pivotally mounted brake arm having a first position juxtaposed said first leg and effectively disengaged therefrom and movable from the first position to a second position responsive to a predetermined frictional drag between said brake arm and said belt means, the frictional drag in said loose side condition being below said predetermined drag and insufficient to cause movement of said brake arm, said brake arm being responsive to the change of said first leg from the loose side condition to the tight side condition effecting frictional drag exceeding said predetermined drag for movement to said second position; and a second brake member engageable with said belt means upon movement of said brake arm to said second position and cooperable with said brake arm for effecting the application of a substantially increased amount of drag on said endless belt means to effect a braking of said rotatable member.

18. In a belt driven apparatus as defined in claim 17 and further including means engageable with said endless belt means for limiting the available slack in said belt means to facilitate the application of increased drag to said endless belt means by said brake arm in said second position.

19. In a belt driven apparatus as defined in claim 17 and further including resilient stop means engageable by said brake arm at said second position.

20. In a belt driven apparatus, the combination comprising: a rotatable member; drive means for rotating said rotatable member; endless belt means drivingly connecting said drive means to said rotatable member; and brake means engaged in a first posture with said belt means and operable from said first posture by said belt means to a second posture for applying frictional drag to said belt means to effect braking of said rotatable member.

21. In a belt driven apparatus, the combination comprising: a rotatable member; drive means for rotating said rotatable member; endless belt means drivingly connecting said drive means to said rotatable member; and means engaged in a first posture with said belt means for relatively low frictional drag and operable to a second posture responsive to said relatively low frictional drag for applying relatively high frictional drag to said belt means to effect braking of said rotatable member.

* * * * *